United States Patent [19]

Lippman

[11] 4,439,473

[45] Mar. 27, 1984

[54] HYDROPHOBIC FOAM FABRIC COATING

[76] Inventor: Jerry Lippman, 7855 Boulevard East, North Bergen, N.J. 07047

[21] Appl. No.: 430,781

[22] Filed: Sep. 30, 1982

[51] Int. Cl.³ .......................... B32B 5/18; B05D 3/02
[52] U.S. Cl. ...................................... 428/90; 427/373; 427/387; 427/393.5; 428/141; 428/219; 428/290; 428/304.4
[58] Field of Search ............... 428/315.5, 315.7, 315.9, 428/317.9, 90, 290, 219, 304.4, 141; 427/373, 387, 393.5; 521/134

[56] References Cited

U.S. PATENT DOCUMENTS

| | | | |
|---|---|---|---|
| 2,993,871 | 7/1961 | Shannon et al. | 521/181 |
| 3,081,269 | 3/1963 | Shannon et al. | 521/112 |
| 3,140,198 | 7/1964 | Dawson et al. | 428/391 |
| 3,496,055 | 2/1970 | Hart, Jr. | 428/95 |
| 3,497,416 | 2/1970 | Critchfield et al. | 428/245 |
| 3,499,811 | 3/1970 | Clarke | 428/315.5 |
| 3,551,830 | 12/1970 | Hodge et al. | 428/315.5 |
| 3,575,910 | 4/1971 | Thomas | 524/588 |
| 3,577,264 | 5/1971 | Nordstrom | 428/334 |
| 3,622,527 | 11/1971 | Dieterich et al. | 428/315.5 |
| 3,640,916 | 2/1972 | Dill | 521/72 |
| 3,723,167 | 3/1973 | Nordstrom | 428/407 |
| 3,751,329 | 8/1973 | Fonzi et al. | 428/315.5 |
| 3,853,601 | 12/1974 | Taskier | 428/315.5 |
| 3,874,986 | 4/1975 | Browall et al. | 428/315.9 |
| 4,022,941 | 5/1977 | Prokai et al. | 427/358 |
| 4,035,540 | 7/1977 | Gander | 428/198 |
| 4,105,594 | 8/1978 | Dietrich et al. | 521/100 |
| 4,116,741 | 9/1978 | Thoma et al. | 156/236 |
| 4,133,938 | 1/1979 | Bingham | 428/447 |
| 4,181,770 | 1/1980 | Schuhmacher et al. | 428/260 |
| 4,291,136 | 9/1981 | Keogh | 525/102 |
| 4,353,945 | 10/1982 | Sampson | 428/315.7 |

*Primary Examiner*—William J. Van Balen

[57] ABSTRACT

This application discloses open-cell foam coating compositions and open-cell coated fabrics. The foam coating comprises a fabric substrate and a breathable fine cell foam coating adhered to the substrate wherein the foam coating is comprised of an open cell foam polymer lattice and a hydrophobic material which coats substantially all the surfaces of the polymer lattice and renders the breathable foam coating water repellant and waterproof.

25 Claims, No Drawings

HYDROPHOBIC FOAM FABRIC COATING

FIELD OF THE INVENTION

This application relates to hydrophobic open-cell foam coating compositions suitable for application to fabric substrates.

BACKGROUND OF THE INVENTION

Polymeric foam compositions have been widely employed in the manufacture of shaped articles, insulators, foam backings for carpets, fabric coatings, as well as coatings for wire and cable. In particular, open-cell foams, wherein the internal cell voids of the foam are interconnected, have been employed as fabric coatings. While imparting softness, breathability and insulating properties to the foam, the interconnected cells of open-cell foams present sites through which water may enter and pass through the foam.

For fabric coating applications, such as foam coatings for rainwear, footwear or the like, it is desirable to utilize a foam which is breathable in the sense that it readily passes air and water vapor, while at the same time is water repellant and does not readily transmit liquid water.

BRIEF DESCRIPTION OF THE INVENTION

It is an object of this invention to provide a coating composition suitable for application to a fabric substrate, which provides a breathable, water-repellant and waterproof open-cell foam coating layer on the fabric substrate, which is resistant to water and conventional laundry detergents and, preferably, is also resistant to conventional dry cleaning agents, i.e., perchloroethylene and Stoddard's solvent.

In accordance with the foregoing objective, this invention provides an open-cell foam coated fabric comprising a fabric substrate, and a breathable foam coating adhered to the fabric substrate, wherein the foam coating is comprised of an open-cell polymer lattice, and a cured hydrophobic material which coats substantially all of the surfaces of the polymeric lattice, and renders the breathable foam coating water repellant and waterproof.

In addition, this invention provides a foamable coating composition suitable for foaming and then for coating onto a fabric substrate comprising a coatable aqueous dispersion of a hydrophobic material and a foamable polymer, the dry weight of the hydrophobic material comprising about 1.25% to about 10% of the dry weight of the foamable polymer, and effective amounts of a foam structuring agent and pigment. A hydrophobic polymer and polymer latex which co-cure may be employed to provide a breathable, water repellant, waterproof, fine open-cell foam.

Further, this invention provides a method for coating fabric substrates which comprises applying the foamed coating composition of this invention to a fabric substrate, and co-curing the hydrophobic polymer and the foamable polymer component.

DETAILED DESCRIPTION OF THE INVENTION

Breathable, water repellant, waterproof, fine open-cell foam coatings are provided in accordance with the present invention by incorporating a hydrophobic material in the lattice of a fine foam, such that all surfaces of the polymer lattice are coated with the hydrophobic material employed.

The use of such a hydrophobic material renders a normally water permeable open-cell foam hydrophobic in nature, so that it no longer freely passes water, but freely passes air and water vapor. In this respect the coated fabrics of this invention are referred to as breathable and waterproof. Further, water beads on the surface of the foam coatings of this invention, and in this respect the foam is properly characterized as being water repellant.

The water repellant and breathable foam of this invention comprises a foamable polymer as a major component. The foamable polymer, employed herein, includes any natural or synthetic polymer (i.e., homopolymer, copolymer, terpolymer, etc.) or combination of polymers which can be dispersed in water, and are capable of being cured by conventional means to provide the desired open-cellular foam structure. Preferably, a foamable polymer latex is employed, such as those conventionally employed as foam coatings for fabric substrates. However, the foamable polymer selected should be resistant to conventional laundry detergents, and preferably is also resistant to conventional dry cleaning agents.

A preferred class of foamable polymers are the latexes of acrylic polymers such as those prepared by the addition polymerization of acrylonitrile, alkylacrylonitrile (e.g., methacrylonitrile), and the like and the polymers of ethylenically unsaturated carboxylic acid compounds and the corresponding alkyl esters such as the addition polymers of acrylic acid, methacrylic acid, methacrylate, ethylacrylate, butylacrylate, maleic acid, fumaric acid, and the like. Additional examples of acrylates which can be employed as the foamable polymers of this invention include polymers of amylacrylate, 2-ethylhexylacrylate, cyclohexylacrylate, vinylacrylate, allylacrylate, beta-methallylacrylate, hydroxymethylacrylate, butyl methacrylate, hexyl methacrylate, allylmethacrylate, benzyl methacrylate, diethyleneglycol dimethacrylate, methyl ethacrylate, methyl butacrylate, and butadiene acrylonitrile latexes. For example, the foamable polymer may be formed from a mixture of one or more of acrylonitrile, ethylacrylate, acrylic acid, butylacrylate, and 2-ethylhexylacrylate crosslinked by a suitable crosslinking agent such as a melamine resin crosslinking agent. By selecting one or more different acrylates for use, the properties of the resultant foam may be adapted for a particular end use, and adapted for use as a coating onto a particular fabric substrate.

Suitable foamable polymers for use as the foamable polymer component of this invention also include the polyurethane foams prepared from aqueous systems, or extracted urethane polymeric materials, and particularly, those polyurethane foams conventionally employed as fabric coatings. The homopolymers and copolymers of 1,4-diene compounds, such as butadiene, 2-chlorobutadiene, Isoprene, Neoprene (e.g., chlorinated isoprene latexes) and the like may also be employed, as well as natural rubber latexes.

The compositions of this invention are conveniently formed by employing commercially available aqueous polymer latex compositions. Preferably the polymer latexes include about 40-60% by weight, e.g., about 45-50% by weight of the polymeric solids component dispersed in water, by a suitable emulsifier. Alternatively, the polymeric emulsions may be prepared by adding the appropriate monomers to water in the presence of an emulsifier. Any emulsifier (anionic, cationic or nonionic) may be employed, which is compatible with the polymer and the other components of the formulation. Commercially available polymer emulsions useful in accordance with this invention include, for example, Rhoplex TR-934, Rohm & Haas Co., which is a self-cross-linking acrylic copolymer, or Rhoplex TR-77, manufactured by Rohm & Haas Co. which is a crosslinkable acrylic polymer emulsion, as well as acrylic polymer latexes commercially available from B. F. Goodrich Co. under the product designation numbers 2671 and 2679.

The hydrophobic component of the composition may be a hydrophobic polymer (copolymer, terpolymer, etc.) or combination of polymers, which may be dispersed in water along with the foamable polymer component, to provide a substantially homogeneous dispersion of the foamable polymer and hydrophobic material. Thus, the foamable polymer and hydrophobic material must be compatible. The hydrophobic component employed herein may be a curable hydrophobic polymer which cures under essentially the same conditions employed to cure the foamable polymer component. In this sense, the hydrophobic polymer and foamable polymer component are referred to herein as co-curing. When the hydrophobic polymer component is incorporated in the cured foam coating layer, the hydrophobic polymer cannot be extracted from the foam lattice with conventional aqueous detergents, and, preferably, the hydrophobic material is one which is also insoluble in dry cleaning agents, i.e., it cannot be extracted from the coating with conventional dry cleaning agents.

A suitable hydrophobic material for use herein is a crosslinkable polysiloxane. Crosslinkable and curable polysiloxane emulsions are well known in the art, and are employed for a number of uses; e.g., to render flexible sheet material non-adherent to surfaces, and as hand modifiers for use in a wide variety of durable press, knit and woven fabric formulations. In particular, U.S. Pat. application Ser. No. 3,900,617 discloses polysiloxane emulsions which consist of a silanol chain-stopped disubstituted polysiloxane, which is crosslinkable by a hydrogen containing polysiloxane, when catalyzed by an organotin salt of a fatty acid.

Emulsions of polysiloxanes which include vinyl groups are disclosed by U.S. Pat. application Ser. No. 4,066,594. Such polysiloxanes may terminate in a silanol group and include a vinyl group pendant from the polymer chain. Emulsions of such polysiloxanes are crosslinkable with an organohydrogen polysiloxane and platinum calatyst. Representative polysiloxanes of this type are:

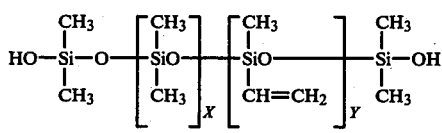

and

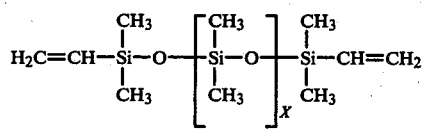

Wherein X and Y are positive integers so that the polysiloxane has 0.1 to 1.02 weight percent vinyl groups, and a viscosity between about 25,000 and 1,000,000 cps.

Suitable curable polysiloxane emulsions are commercially available from General Electric Co., Waterford, New York under the product designation SM2185. SM2185 has a specific gravity of 1.01, a viscosity of about 1200 cps (25° C.), and contains 60% by weight of a high viscosity silicone polymer in a water diluent. These silicones cure to a solid state, and are not extractable from the foamed polymer lattice which includes them, either with detergents or dry cleaning agents such as perchloroethylene.

The amount of hydrophobic material employed is adjusted so that the interior surfaces of the foam cells are coated by the hydrophobic material, but the foam cells are not completely filled or sealed by the hydrophobic material. If too much of the hydrophobic material is employed, the foam cells will be sealed by the hydrophobic component, and the breathability of the foam will be impaired. On the other hand, if too little of the hydrophobic material is employed, the water repellant and waterproof properties of the foam will be inadequate. While the amount of the hydrophobic agent employed may vary depending on the particular foamable polymer employed, and the density of the foam, in general, about 1.25% to about 10%, and preferably about 5% to about 6% by weight of the hydrophobic material based on the dry-weight of the foamable polymer may be employed.

It is believed that the water repellant properties of the foam are a result of the migration of the hydrophobic component within the polymeric lattice of the foam. More specifically, as a result of the incompatibility or insolubility of the hydrophobic material with the polymer lattice, the hydrophobic material tends to migrate through the polymer lattice as the polymer cures, to substantially all surfaces of the foam lattice, including the internal surfaces of the polymer lattice which bound the cell voids of the foam. It is believed that this migration results in a coating of the hydrophobic component on all of the surfaces of the foam, and imparts water repellant and waterproof properties to the foam. It is believed that about 80% to about 90% of the hydrophobic material bleeds to the surfaces of the polymer lattice.

In addition to curable polysiloxanes, curable fluoropolymers (fluorocopolymers, etc.) may also be employed as the hydrophobic component of the present foam composition. Fluoropolymers suitable for this purpose include polytetrafluoroethylene emulsions and commercially available fluoropolymer emulsions such as Scotchguard fluorochemicals manufactured by 3M Company, Milease F-14, available from ICI Americas, Inc., Wilmington, Del. as well as Zepel RN, Telfon NPA and Teflon G, manufactured by E. I. duPont de Nemours & Co. as soil and stain repellant products, i.e., products conventionally employed as a finishing agent for upholstery, drapes and slipcovers.

Teflon NPA, Teflon G and Zepel RN are commercially available in the form of aqueous dispersions of the fluoropolyxer in water. The aqueous fluoropolymer dispersion Zepel RN has a viscosity at 80° F. (27° C.) of 14 cps, a specific gravity at 77°–78° F. (25°–26° C.) of 1.07, a pH of 7.8, and a density (lb./gal.) at 77° F. of 8.89. The aqueous dispersion, Teflon NPA has a viscosity at 80° F. (27° C.) of 2 cps, a specific gravity at 25° C. of 1.033, a density, lb./gal. at 25° C. of 8.61 and a pH of 4.0. Teflon G has a viscosity at 27° C. of 2 cps, a specific gravity of 25° C. of 1.026, a density lb./gal. at 25° C. of 8.55 and a pH of 3.7. Fluoropolymers such as the Teflons are advantageously employed because these polymers do not adversely affect the whiteness or tensile strength of fabrics which they contact, nor do they noticeably affect the shade or lightness of most colors. Milease F-14 is a non-viscous milky nonionic emulsion of a fluorochemical polymer, having a specific gravity of 1.04.

The conditions chosen to cure foamable polymer latexes containing fluoropolymers will, of course, depend and be adjusted based on the conditions required to dry and cure the foamable polymer component. However, suitable fluoropolymer dispersions such as Teflon NPA and Teflon G cure at a temperature of about 300° to 340° F. (149° to 171° C.), Zepel RN cures at temperatures of 300° to 360° F.(149° to 182° C.).

In addition to curable silicones and fluoropolymers, high molecular waxes may also be employed as the hydrophobic component of this invention. The wax employed is one which is insoluble in water and cannot be extracted from the foamed polymer lattice with either water, laundry detergents or conventional dry cleaning solvents such as perchloroethylene. An example of such a wax is Acrowax C, available from Glyco Chemical Co., which is N,N-ethylene-bis-stearamide. Suitable waxes are micronized waxes which have particle sizes of less than about 5 microns. Preferably the wax is employed by first forming a dispersion of the wax in water employing a conventional wetting agent, and then adding the micronized wax dispersion to, for example, a polymer latex. During the curing step the wax melts and migrates through the polymer lattice.

In addition to the foamable polymer component, and the hydrophobic component, a number of other ingredients suitable for addition to foam coating compositions may be employed. Examples of suitable additions to the coatings of this invention include conventional plasticizers, as well as fillers, bacteriocides, fungicides, dyes or pigments, pigment dispersants, flame retardants, thickeners, cell modifiers, stabilizers, etc. Foam structuring agents, such as ammonium stearate, sodium lauryl sulfate, ammonium lauryl sulfate, ammonium sulfosuccinate, or the like, may be added to the coating composition to enhance foam formation and to provide the desired open-cell foam structure upon whipping and frothing of the composition, as will be more fully described below.

When the foamable polymeric component includes reaction sites capable of partaking in crosslinking reactions with an auxiliary crosslinking agent, a crosslinking agent may be included in the composition. The crosslinking agent may be capable of crosslinking the foamable polymer as well as the hydrophobic agent. For example, when the foamable polymeric component is an acrylic polymer, a crosslinking agent, preferably a melamine resin, may be added to a latex of the acrylic polymer. Suitable melamine resins such as Cymel 303 crosslink acrylic polymers with the aid of acid catalysts, such as para-toluene sulfonic acid at temperatures of about 250° F. to about 350° F. Crosslinking contributes to both the ultimate strength of the foam as well as to the speed at which the foam cures to a washable, and preferably dry cleanable, coating.

Prior to the foaming step, a foamable dispersion of the hydrophobic material in a polymer latex may be thickened by the addition of a thickening agent such as ASE60, or ASE90 (Rohm & Haas Co.) which are dispersions of acrylic polymers. The dispersion of the foamable polymer and hydrophobic agent is thickened to the extent that the viscosity of the aqueous foam formed from the dispersion is suitable for application to a fabric substrate by conventional coating processes. For example, a pre-foamed composition may have a viscosity of about 5,000 to 15,000 cps, and a density of about 8.3 to 8.5 lbs/gallon.

Optionally, the coating composition may also include small amounts of auxiliary blowing agents. For instance, high boiling fluorocarbons can be employed, and in particular those having boiling points of about 40° C. or above, e.g., freons, tetrachloroethane, chloromonofluoroethane or similar compounds. The auxiliary blowing agents may be employed when additional expansion of the foam during heat curing is desired.

The composition is foamed by mechanically incorporating an inert gas, and preferably air, into the foamable composition. Air can be introduced into the emulsion by the use of high shear equipment such as an Oakes mixer or a Hobart mixer, conventionally employed in the art. In an Oakes mixer the air is introduced under pressure, while in a Hobart mixer, atmospheric air is drawn into the emulsion by the whipping action of the mixer.

Air is whipped into the foamable composition until the viscosity of the foamed composition reaches a suitable density, and preferably, the density of the foam is at least about 75% of the density of pre-foamed emulsion. However, suitable foams may be prepared having densities of about 60% to about 85% of the pre-foamed emulsion. The foam upon completion of the foaming step is workable at ambient temperatures. The foam may be coated onto a fabric substrate by conventional coating processes, including floating knife, knife-over-roll or reverse roll processes. The composition may be applied to the fabric substrate in one pass to provide a coating layer of about 20 to about 40 wet mils. The coating may be dried and cured over a period of about 1 to about 5 minutes in steps from about 200° F. to about 350° F. The cured coating may comprise about 1 to about 5 ounces/yard$^2$ of the fabric substrate.

A typical foamable composition may comprise on a weight basis an aqueous dispersion formed from about 50% to about 70% of a foamable polymer latex which includes about 40% to about 60% polymer solids, a dispersion of a hydrophobic material, wherein on a dry-weight basis the hydrophobic material comprises about 1.25% to about 10%, preferably about 5% to about 6% of the dry weight of the foamable polymer, and about 0.5% to about 5% of a melamine crosslinking agent when an acrylic polymer is employed. Foam structuring agents, thickeners and plasticizers, etc. may be added to the dispersion of the other components of the formulation.

The wet foam may be flocked prior to drying and curing. A humectant such as propylene glycol may be included in the formulation. Any of a number of natural or synthetic fibers may be employed including cotton, rayon, polyester, acrylic fibers, etc., to provide a flocked surface on the fabrics coated with the foams of this invention. The flock may be applied electrostatically, mechanically or by a combination of these methods. After the flock is applied, the coating is cured.

The composition of this invention may be applied to any woven or non-woven fabric, comprised of synthetic, natural or mixtures of synthetic and natural fibers including nylon such as Nylon 6, 66 or 12, rayon, polyester, wool, cotton, fiberglass fabrics comprised of acrylic fibers or acrylic fiber blends, aramel fibers, etc. For instance, fabric substrates may be comprised of nylon fabrics of about 1 to about 2 and up to about 5 ounces/square yard fabric weight.

The hydrophobic properties of the coated fabrics discussed herein render them particularly well suited for use in the manufacture of rainwear, i.e., raincoats (especially when a nylon substrate is employed), outer wear, tent materials, clothing, etc.

Foams prepared from the foamable composition of this invention may also be employed to prepare shaped articles. For example, the foam may be coated onto a release sheet, and when the foam is peeled from the release sheet, it may be employed as a breathable bandage, suitable for application to burn wounds, etc. The release sheet may be comprised of polyethylene, silicon treated paper, etc.

The following example is illustrative of the invention but is not intended to be a limitation thereon.

EXAMPLE 1

A foamable composition was prepared from the following ingredients.

|  | | Parts by Weight |
|---|---|---|
| TR77 | A | 180 |
| TR934HS |  | 95.7 |
| Benzoflex 50 |  | 16.2 |
| Paratoluene sulfonic acid | B | 0.27 |
| Water |  | 1 |
| NH$_4$OH |  | 3 |
| TiO$_2$ | C | 4 |
| Tetrasodiumpyrophosphate |  | 0.08 |
| Water |  | 4 |
| AQ6009 | D | 16 |
| Water |  | 144 |
| Cymel 303 |  | 4 |
| Propylene glycol |  | 5.4 |
| Water |  | 76 |
| Ammonium stearate |  | 32.7 |
| Sodium lauryl sulfate |  | 1.4 |
| SM 2185 |  | 11.3 |
| ASE 60 |  | 11 |
| ASE 95 |  | 0.8 |

A foamable composition was prepared by mixing together the foamable polymer dispersions TR77 and TR934HS, and the Benzoflex plasticizer, to provide a homogeneous dispersion of ingredients. To the first emulsion, a solution of paratoluene sulfonic acid in water (B), as well as a dispersion (C) of titanium dioxide pigment in ammonia in the presence of a dispersant (tetrasodium pyrophosphate) for the titanium dioxide pigment, and a mixture of tinting agent AQ6009 in water are added to dispersion (A). Finally, Cymel 303 (a melamine resin), propylene glycol (a humectant), ammonium stearate, sodium lauryl sulfate, SM 2185, a polysiloxane dispersion, and thickeners ASE 60, ASE 90 are added. The pH of the composition was in the range of about 8 to 10. The composition was in the form of a relatively thick substantially homogeneous dispersion of the listed ingredients. The composition was then transferred to a Hobart mixer and foamed with air until the density of the composition was reduced by about one-half.

The foam was then coated onto a woven nylon cloth substrate. About 30 wet mils of the foam was applied.

The foam coated nylon was then oven cured by passing it through an oven for two minutes at 250° F., and for three minutes at 350° F.

The product had excellent hand and drapability, and the open-cell foam coating layer was firmly adhered to the nylon fabric substrate.

The product was tested and found to be hydrophobic in the sense that it repels water and does not readily transmit liquid water. Further, the hydrophobic properties of the fabric persisted even after the application of the dry cleaning solvents (perchloroethylene) to the fabric.

EXAMPLE 2

Following the procedure of Example 1, a coating composition is prepared from the following ingredients:

|  | Parts by Weight |
|---|---|
| TR 934HS | 275.7 |
| paratoluene sulfonic acid | 0.27 |
| water | 1 |
| NH$_4$OH | 3 |
| TiO$_2$ | 4 |
| tetrasodiumpyrophosphate | 0.08 |
| water | 4 |
| AQ6009 | 16 |
| water | 144 |
| Cymel 303 | 4 |
| water | 76 |
| ammonium stearate | 32.7 |
| sodium lauryl sulfate | 1.4 |
| milease F-14* | 11.3 |
| ASE 60 | 11.0 |
| ASE 95 | 0.8 |

*A fluoropolymer dispersion.

A coated nylon fabric (2 ounce/yd$^2$ substrate weight) is prepared by mechanically whipping air into the formulation until the density of the formulation is about 4.15 lbs/gallon, and the coating the fabric with about 30 wet mils of the composition.

As illustrated by the foregoing examples, the coating composition is in the form of an aqueous dispersion which may include about 30% to about 60% by weight dispersed solids, and preferably about 40% to about 60% dispersed solids.

While certain representative embodiments of the invention have been described herein for purposes of illustration, it will be apparent to those skilled in the art that modifications therein may be made without departing from the spirit and scope of the invention.

I claim:

1. An open cell foam coated fabric comprising a fabric substrate and a breathable fine cell foam coating adhered to the fabric substrate, wherein the foam coating is comprised of an open cell foam polymer lattice, and a hydrophobic material which coats substantially all of the surfaces of the polymeric lattice, and renders the breathable foam coating water repellant and waterproof.

2. The fabric according to claim 1 wherein the hydrophobic material is a hydrophobic polymer, which cures under substantially the same conditions as the foamed polymer which comprises said lattice.

3. The fabric according to claim 2 wherein the foamed polymer is an acrylic polymer, and the cured hydrophobic polymer is a cured polysiloxane polymer or a cured fluoropolymer, or a wax having an average particle size of less than about 5 microns.

4. The fabric according to claims 2 or 3 wherein the hydrophobic polymer comprises on a dry-weight basis about 1.25% to about 10% by weight of the foamed polymer.

5. The fabric according to claim 4 wherein the foamed polymer is an acrylic polymer, polyurethane or polyacrylonitrile; and the hydrophobic polymer is a cured fluoropolymer or a cured polysiloxane, wherein the hydrophobic polymer comprises about 5% to about 6% by weight of the foamed polymer.

6. The fabric according to claim 5 wherein the fabric substrate is comprised of a nylon fabric.

7. The fabric according to claim 2, wherein the surface of the coating is flocked.

8. The fabric according to claims 1 or 5 wherein the fabric substrate is selected from the group consisting of nylon, wool, cotton, rayon, polyester and fiberglass fabrics.

9. The fabric according to claim 1 wherein said coating comprises a cured coating of a coating composition which comprises on a weight basis an aqueous despersion comprised of about 50% to about 70% of a foamable polymer latex comprised of about 40% to about 60% polymer solids, and a hydrophobic material which comprises about 1.25% to about 10% of the dry weight of the foamable polymer, effective amounts of foam structuring agents and thickeners, and the composition includes about 30% to about 60% by weight dispersed solids.

10. The fabric according to claim 9 wherein the coating when cured comprises about 1 to about 2 ounces per square yard of the fabric substrate.

11. The fabric according to claim 1 wherein the coating comprises a cured coating of a coating composition which comprises on a weight basis an aqueous dispersion comprised of about 50% to about 70% of a crosslinkable acrylic polymer latex comprised of about 40% to about 60% polymer solids, about 1.25% to about 10% of a curable polysiloxane or fluoropolymer based on the weight of the acrylic polymer, about 0.5% to about 5% of a melamine crosslinking agent, effective amounts of a foam structuring agent and filler; and the dispersion comprises from about 30% to about 60% solids.

12. The fabric according to claim 11 wherein the coating comprises about 1 to about 2 ounces per square yard of a nylon fabric substrate which has a fabric weight of about 1 to about 2 ounces per square yard.

13. The coated fabric according to claim 12 wherein the coating composition further comprises a humectant and the surface of said coating is flocked.

14. The coated fabric according to claim 13 wherein the humectant is propylene glycol.

15. The fabric according to claim 1 wherein the hydrophobic material is N,N-ethylene-bis-stearamide.

16. A coating composition suitable for foaming and coating onto a fabric substrate comprising an aqueous dispersion of a curable foamable polymer and a hydrophobic material, wherein the hydrophobic material comprises about 1.25% to about 10% by weight of the foamable polymer, and the dispersion comprises about 30% to about 60% by weight solids; and said dispersion cures to a breathable, fine open-cell foam lattice, wherein all of the surfaces of the lattice are coated with the hydrophobic material which renders the cured coating waterproof and water repellant.

17. A coating composition which comprises on a weight basis about 50% to about 70% of a crosslinkable acrylic polymer latex comprised of about 40% to about 60% polymer solids, about 1.25% to about 10% of a curable fluoropolymer or polysiloxane based on the weight of the acrylic polymer, about 0.5% to about 5% of a melamine crosslinking agent, and effective amounts of a foam structuring agent and filler; and the dispersion includes about 30% to about 60% solids, and has a pH of about 8 to about 10.

18. The coating composition according to claim 17 further comprising plasticizer and pigment.

19. The coating composition according to claim 18 further comprising an effective amount of humectant.

20. The coating composition according to claim 16 wherein said polymer is acrylonitrile.

21. The coating composition according to claim 16 wherein said polymer is an acrylic polymer.

22. A method for preparing a foam coated fabric which comprises foaming the coating composition of claim 16 with air, coating the foam onto a fabric substrate, and then curing the coating.

23. A method for preparing a foam coated fabric comprising foaming the coating composition of claim 17 with air, coating the foam onto a fabric substrate and then curing the coating by the application of heat.

24. The method according to claim 23 wherein the density of the wet foam is about 60% to about 85% of the coating composition prior to foaming.

25. The method according to claim 24 wherein about 30 wet mils of the coating composition are applied to the fabric substrate.

* * * * *